(12) United States Patent
Lan

(10) Patent No.: US 7,233,558 B2
(45) Date of Patent: Jun. 19, 2007

(54) DVD SEAMLESS PLAYBACK SYSTEM

(75) Inventor: Ming-Yi Lan, Taipei (TW)

(73) Assignee: Ali Corporation, Taipei (TW)

( * ) Notice: Subject to any disclaimer, the term of this patent is extended or adjusted under 35 U.S.C. 154(b) by 534 days.

(21) Appl. No.: 10/710,174

(22) Filed: Jun. 23, 2004

(65) Prior Publication Data

US 2005/0249079 A1   Nov. 10, 2005

(51) Int. Cl.
*G11B 27/36* (2006.01)

(52) U.S. Cl. .............................. 369/53.34; 369/53.31; 386/124

(58) Field of Classification Search ............... None
See application file for complete search history.

(56) References Cited

U.S. PATENT DOCUMENTS

| | | | |
|---|---|---|---|
| 6,173,114 B1 * | 1/2001 | Yanagihara et al. | 369/47.28 |
| 6,396,874 B1 * | 5/2002 | Kato | 386/109 |
| 6,573,819 B1 * | 6/2003 | Oshima et al. | 386/111 |
| 6,574,423 B1 * | 6/2003 | Oshima et al. | 386/111 |
| 6,795,641 B2 * | 9/2004 | Okada et al. | 386/95 |
| 6,925,250 B1 * | 8/2005 | Oshima et al. | 386/111 |
| 6,954,584 B2 * | 10/2005 | Kashiwagi et al. | 386/105 |

* cited by examiner

*Primary Examiner*—Thang V Tran
(74) *Attorney, Agent, or Firm*—Winston Hsu

(57) ABSTRACT

A DVD seamless playback system has a first timer, a second timer, a register, a processor, a buffer, and a decoder. The processor is capable of parsing bit-streamed data and of setting count initial values of the first and the second timers alternatively if the data stored in the register is updated.

5 Claims, 4 Drawing Sheets

DVD SEAMLESS PLAYBACK SYSTEM

BACKGROUND OF INVENTION

1. Field of the Invention

The present invention relates to a DVD seamless playback system, and more particularly, to a DVD seamless playback system having two alternatively set timers.

2. Description of the Prior Art

DVD-Video was originally designed to meet the requirements of the movie industry, in particular, to provide a complete movie on a single "compact" optical disc. In the 1990s, several technology companies, such as Pioneer, Sony and Philips, started to develop a new digital video disc format, with the goal of recording two or more hours of high-quality video onto one disc, as a next-generation replacement for the LaserDisc (LD). In the end of 1995, Pioneer launched a digital versatile disc, called for short the DVD, a totally new type of optical storage media for storing video data. From then on, DVD become one of the most popular video storage media. The first DVD-Video player for playing video stored in a DVD went on sale shortly thereafter.

Since DVD was intended as a technology to replace LaserDisc (LD), DVD needed to provide at least equivalent video quality. As the result of many rounds of video quality evaluation, and with the assumption that DVD would use variable-rate video compression, it was determined that a data rate of 3.5 Mbps was the minimum requirement. Then, considering audio quality, flexibility for international use, and multimedia capability, it was decided to provide capacity for Dolby AC-3 audio in three languages (384 kbps×3) and subtitles in four languages (10 kbps×4), resulting in the design of a specification which required a disc capacity of 4.7 GB. A DVD therefore has playback time of about 133 minutes, which is long enough to allow most movies to fit onto a single disc.

DVD is designed to achieve a disc capacity of 4.7 GB, based on the evolution in technology in the ten-plus years since the CD was introduced in 1982. The difference between the DVD specification and the CD specification is not just the move from a near-infrared laser to a red laser. For example, the standard CD track pitch is 1.6 microns, and reducing this by the ratio of DVD to CD laser wavelength (650/780) would result in a 1.33 micron track pitch. However, DVD actually requires a track pitch of 0.74 microns, meaning that tracks are considerably more packed than one might expect. As the track pitch decreases, crosstalk increases, and the radial tilt margin is severely reduced. To be precise, DVD had to be designed with sophisticated skill to guarantee that the quality of data stored in a DVD attained a satisfactory standard.

The files used for DVD-Video and DVD-Audio are arranged in directories called VIDEO_TS and AUDIO_TS respectively. The files in these directories have predetermined names and extensions. Files with the extension ".IFO" contain application information needed to reproduce the content. Files with the ".VOB" extension contain the actual video or audio content.

DVD-Video contains not only the actual video and audio content, which are called "presentation data", but a variety of powerful information which enables features peculiar to the DVD format, such as multi-angle viewing, parental lock, random shuffle playback, etc., and also provides support for special playback modes such as fast forward and reverse. These special extra information are called "navigation data". The navigation data is in essence used to control the presentation of the presentation data.

The navigation data is composed of video manager information (VMGI), video title set information (VTSI), program chain information (PGCI), presentation control information (PCI), and data search information (DSI). In addition to the video and audio content, as described above, the presentation data further consists of sub-pictures. The presentation data consists of at least a title, each of the titles consisting of at least a program chain (PGC). A first program chain in a title consisting of a plurality of program chains is called an Entry PGC. A program chain is composed of a program chain consisting of a precommand, a posecommand and cells, and a plurality of cells in a video object (VOB).

As mentioned above, since DVD requires well thought out solutions to guarantee that the quality of data stored in a DVD attain a satisfactory standard, how to implement these solutions is becoming one of the most important issues in the DVD industry.

SUMMARY OF INVENTION

It is therefore a primary objective of the claimed invention to provide a DVD seamless playback system having two timers, so as to increase the presentation quality of DVDs under the requirement of DVD formats.

According to the claimed invention, the DVD seamless playback system includes a first timer for counting from a first count initial value; a second timer for counting from a second count initial value; a first register for storing a system time clock offset (STC_offset) value; a second register for storing a navigation data; a processor electrically connected to the first register, the second register, the first timer and the second timer for detecting if the STC_offset value stored in the first register is updated, for parsing a bit-streamed data into a navigation data and a presentation data having a flag appended, the flag having either a first value or a second value, for comparing the navigation data parsed from bit-streamed data and the navigation data stored in the second register, for storing the navigation data parsed from the bit-streamed data into the second register, and for setting the first count initial value and the second count initial value; a buffer electrically connected to the processor for storing the presentation data parsed from the bit-streamed data; and a decoder electrically connected to the buffer, the first timer and the second timer for decoding the presentation data stored in the buffer, presentation data having been decoded by the decoder being presented according to a first count value of the first timer if its flag has a value equal the first value, or to a second count value of the second timer if its flag has a value equal the second value.

Whenever the processor determines that the navigation data parsed from the bit-streamed data is smaller than the navigation data stored in the second register or larger than the navigation data stored in the second register by a predetermined value, the processor then detects whether the STC_offset value stored in the first register is updated, (a) if the processor detects that the STC_offset value stored in the first register is updated, and in the meantime ($a_1$) if the processor is appending a flag whose value equals the first value to a presentation data parsed from a preceding bit-streamed data preceding the bit-streamed data, the processor sets the second count initial value of the second timer to a sum of the first count value of the first timer and the updated STC_offset value and parses the bit-streamed data into a presentation data having a flag having a value equal the second value; otherwise ($a_2$) the processor sets the first count initial value of the first timer to a sum of the second count value of the second timer and the updated STC_offset value and parses the bit-streamed data into a presentation data having a flag having a value equal the first value; on the contrary, (b) if the processor detects that the STC_offset value stored in the first register is not updated, and in the meantime ($b_1$) if the processor is appending a flag whose value equals the first value to the presentation data parsed from the preceding bit-streamed data, the processor sets the second count initial value of the second timer to a navigation data parsed from the bit-streamed data and parses the bit-streamed data into a presentation data having a flag having a value equal the second value; otherwise ($b_2$) the processor sets the first count initial value of the first timer to the navigation data parsed from the bit-streamed data and parses the bit-streamed data into a presentation data having a flag having a value equal the first value.

According to the preferred embodiment, the processor is a reduced instruction set computer (RISC), and the navigation data is a system clock reference (SCR) of the bit-streamed data.

It is an advantage of the claimed invention that a DVD seamless playback system having the alternatively set first and the second timers is capable of reducing the frequencies of the problems of video-standstill and video-discontinuity.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
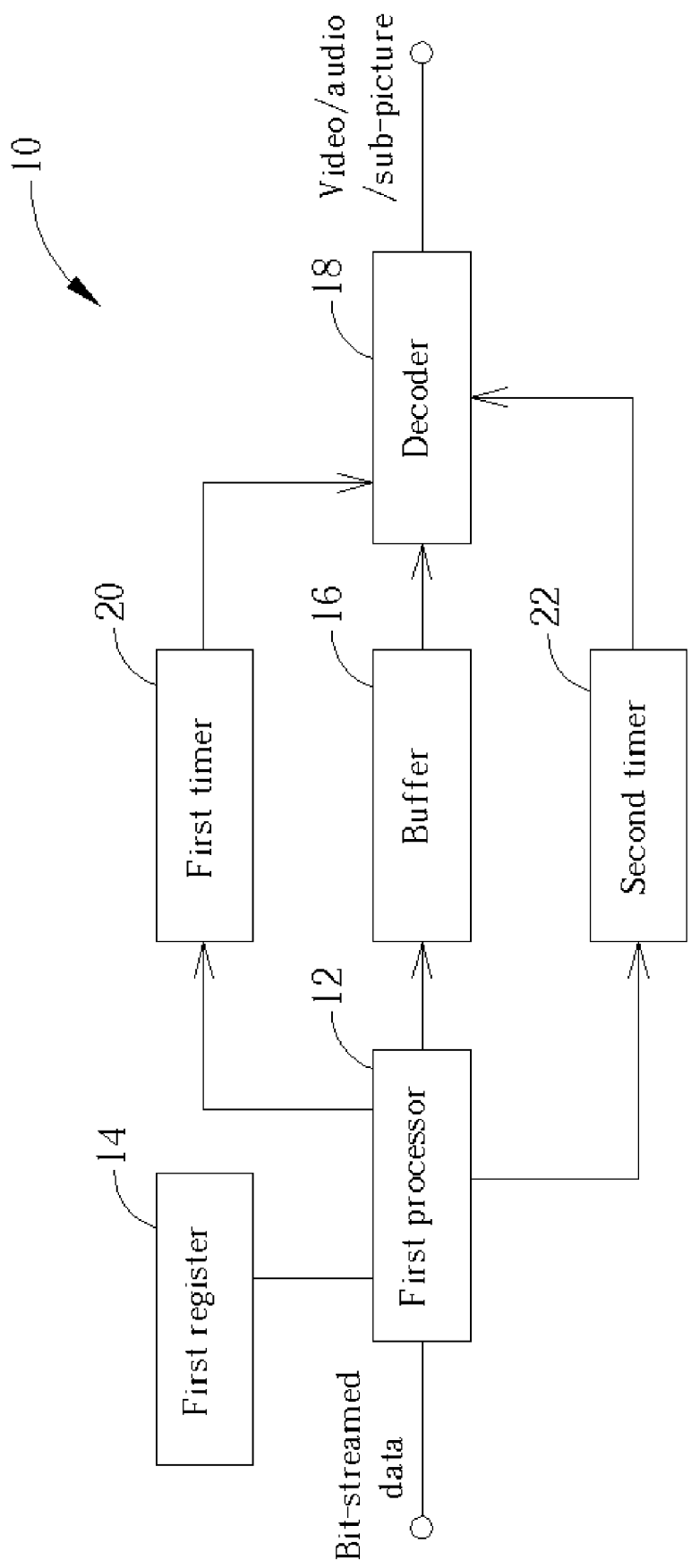
FIG. 1 is a function block diagram of a DVD seamless playback system of the preferred embodiment according to the present invention.

Please refer to FIG. 1, which is a function block diagram of a DVD seamless playback system 10 of the preferred embodiment according to the present invention. The system 10 comprises a first processor 12, a first register 14 electrically connected to the first processor 12, a buffer 16 electrically connected to the first processor 12, a decoder 18 electrically connected to the buffer 16, a first and a second timer 20 and 22, both of which are electrically connected between the first processor 12 and the decoder 18.

The first register 14 stores an STC_offset value derived from navigation data. The STC_offset value stored in the first register 14 is updated whenever two neighboring video object (VOB) formed bit-streamed data are discontinuous. If, for example, one of the two neighboring VOBs is a preceding VOB, and the other a current VOB right next to the preceding VOB, the STC_offset value is equal to a difference between a presentation time (PTM) cur_PTM_start of an initial video frame among an initial group of pictures (GOP) of the current VOB and a PTM pre_PTM_end of a last video frame among a last GOP of the preceding VOB. In short, STC_offset=cur_PTM_start pre_PTM_end.

The first processor 12 is capable of parsing the VOB-formed bit-streamed data into video data, audio data, sub-picture data, and a variety of time stamps, such as a presentation time stamp (PTS) and a system clock reference (SCR), both of which are used for synchronization. Moreover, the first processor 12 is capable of detecting if the STC_offset value stored in the first register 14 is updated, and of detecting if two neighboring VOBs are discontinuous in equivalence. Lastly, the first processor 12 is capable of setting a first and a second count initial values of the first and the second timers 20 and 22 respectively. How the first processor 12 sets these two count initial values is described later.

The buffer 16 stores the video, the audio, and the sub-picture data parsed from the bit-streamed data by the first processor 12. The decoder 18 decodes the video, the audio, and the sub-picture data stored in the buffer 16. The first timer 20 together with the second timer 22 controls the presentation sequence of the video, the audio, and the sub-picture data decoded by the decoder 18.

The operation of the DVD seamless playback system 10 is described as follows. Please refer to FIG. 2, which is a diagram showing the relation between the presentation time and the bit-streamed data of the system 10. In the beginning, the first processor 12 sets the first count initial value of the first timer 20 to a preceding SCR derived by parsing the preceding VOB and enables the first timer 20 to count from the preceding SCR, and appends a flag having a value of "1" to the video, the audio, and the sub-picture data parsed from the preceding VOB. The video, the audio, and the sub-picture data having the flag of "1" appended are all stored into the buffer 16. The decoder 18 decodes the video, the audio, and the sub-picture data having the flag of "1" appended. The decoded video, audio, and sub-picture data are presented sequentially when their corresponding PTSs are equal to a first count value the first timer 20 is counting.

When the first processor 12 detects that the STC_offset value stored in the first register 14 is updated, and in the meantime if the first count value of the first timer 20 is equal to a count value $TM_1$, the first processor 12 sets the second count initial value to a sum of the count value TM and the updated STC_offset value, the second timer 22 therefore having a second count value larger than the first count value of the first timer 20 by the STC_offset value, appends a flag having a value of "2" to the video, the audio, and the sub-picture data parsed from the current VOB, and stores the video, the audio, and the sub-picture data having the flag of "2" appended into the buffer 16. The decoder 18 decodes data stored in the buffer 16, and the decoded video, audio, and sub-picture data having the flag of "2" appended are presented sequentially when their corresponding PTSs are equal to the second count value of the second timer 22 rather than the first count value of the first timer 20. Therefore, when the first count value of the first timer 20 is equal to a count value corresponding to a PTS of a last video frame of the preceding VOB, the second timer 22 correspondingly has the second count value equal to a count value corresponding to a PTS of an initial video frame of the current VOB minus one, and the second timer 22 next has the second count value corresponding to the PTS of the initial video frame of the current VOB. After presenting the last video frame of the preceding VOB according to the first count value of the first timer 20, the system 10 refers the second count value of the second timer 22 alternatively and presents the initial video frame of the current VOB, without the possibility to present video-standstill due to discontinuity between two neighboring VOBs.

Then, when the first processor 12 detects that the STC_offset value stored in the first register 14 is updated again, and in the meantime the second timer 22 has the second count value equal to a count value $TM_2$, the first processor 12 sets the first count initial value to a sum of the count value $TM_2$ and the updated STC_offset value, noting that the STC_offset is negative, appends a flag having a value of "1" rather than "2" to the video, the audio, and the sub-picture data parsed from a succeeding VOB next to the current VOB, and stores the video, the audio, and the sub-picture data having the flag of "1" appended into the buffer 16. The decoder 18 decodes data stored in the buffer 16, and the decoded video, audio, and sub-picture data having the flag of "1" appended are presented sequentially when their corresponding PTSs are equal to the first count value of the first timer 20 rather than the second count value of the second timer 22. Therefore, when the second count value of the second timer 22 is equal to a count value corresponding to a PTS of a last video frame of the current VOB, the first timer 20 correspondingly has the first count value equal to a count value corresponding to a PTS of an initial video frame of the succeeding VOB minus one, and the first timer 20 next has the first count value corresponding to the PTS of the initial video frame of the succeeding VOB. After presenting the last video frame of the preceding VOB according to the second count value of the second timer 22, the system 10 refers the first count value of the first timer 20 and presents the initial video frame of the succeeding VOB, without the possibility to present video-discontinuity due to discontinuity between two neighboring VOBs.

In summary, whenever the first processor 12 detects that the STC_offset stored in the first register 14 is updated, the first processor 12 either (a) sets the first count initial value of the first timer 20 to a sum of the second count value of the second timer 22 and the updated STC_offset, and appends a flag having a value of "1" to video, audio, and sub-picture data parsed from a VOB if a flag appended to video, audio, or sub-picture data just stored into the buffer 16 has a value equal to "2", or (b) sets the second count initial value of the second timer 22 to a sum of the first count value of the first timer 20 and the updated STC_offset, and appends a flag having a value of "2" to video, audio, and sub-picture data parsed from a VOB if a flag appended to video, audio, or sub-picture data just stored into the buffer 16 has a value equal to "1".

In conclusion, the system 10 generates neither video-discontinuity nor video-standstill, even if two neighboring VOB-formed bit-streamed data ready to be presented are discontinuous.

Ideally, SCRs derived from a VOB are slightly increasingly disposed. In detail, the latter of any two neighboring SCRs of a VOB should always be larger than the former by a small enough predetermined value. However, sometimes the latter SCR is far larger or even smaller than the former SCR due to errors introduced during a data-recording process, resulting in that the system 10 has a big chance to generate video-discontinuity and video-standstill when presenting video, audio, or sub-picture data corresponding to the former and the latter SCRs.

Figure 3:
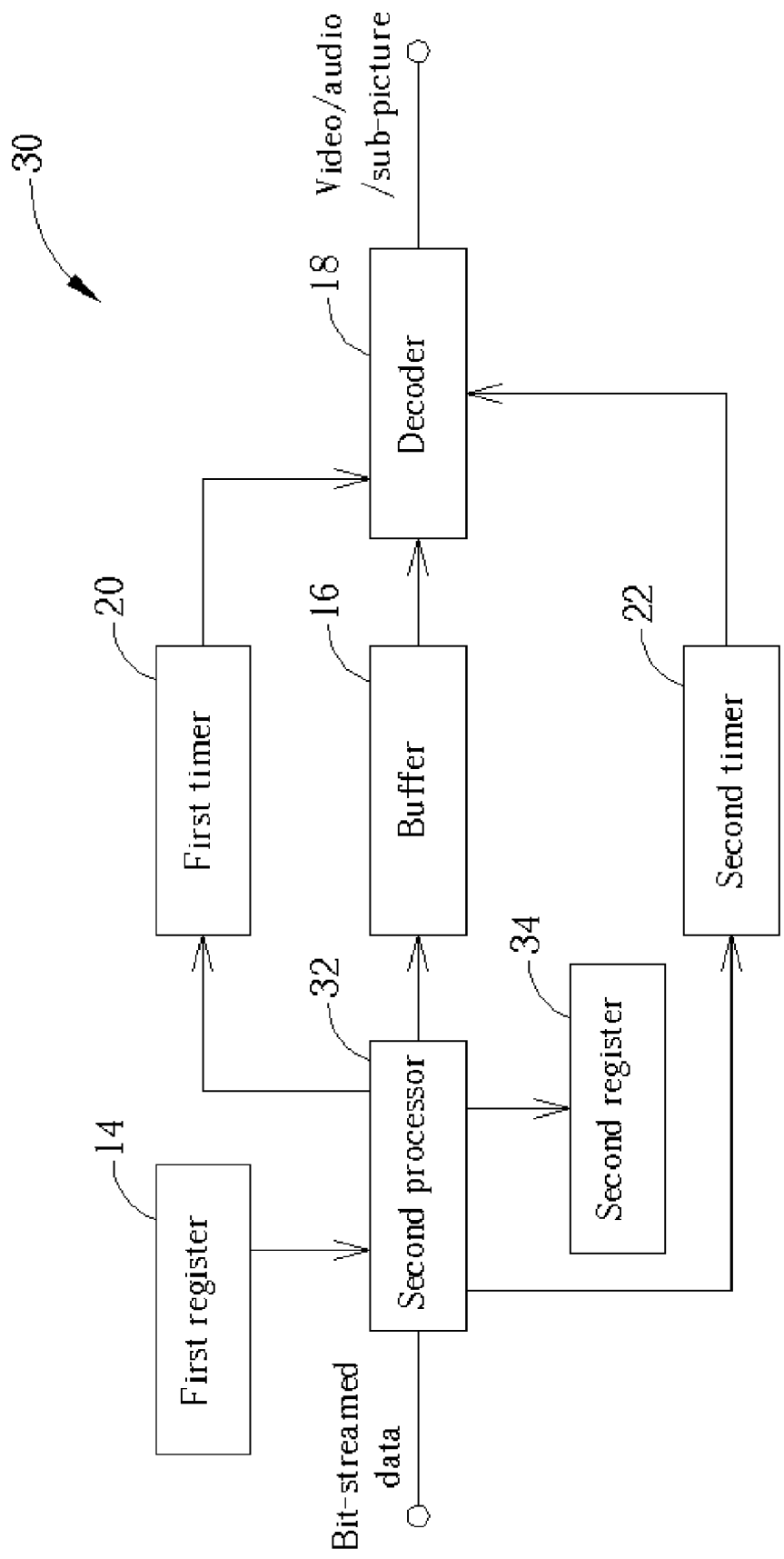
FIG. 3 is a function block diagram of a DVD seamless playback system of a second embodiment according to the present invention.

Please refer to FIG. 3, which is a function block diagram of a DVD seamless playback system 30 of a second embodiment according to the present invention. In addition to the first register 14, the buffer 16, the decoder 18, and the first and the second timers 20 and 22, the system 30 further comprises a second processor 32 electrically connected to the first register 14, the first and the second timers 20 and 22, and the buffer 16, and a second register 34 electrically connected to the second processor 32 for storing SCRs parsed by the second processor 32 from bit-streamed data.

In addition, to be capable of parsing bit-streamed data, detecting if the STC_offset stored in the first register 14 is updated, and setting the first as well as the second count initial values, the second processor 32 is further capable of determining that an SCR parsed from the bit-streamed data is smaller than the SCR stored in the second register 34 or larger than the SCR stored in the second register 34 by a predetermined value, and of updating the SCR stored in the second register 34 with the SCR parsed from the bit-streamed data.

The operation of the DVD seamless playback system 30 is described as follows. In the beginning, the second processor 32 sets the first count initial value of the first timer 20 to a first SCR parsed from first bit-streamed data and enables the first timer 20 to count from the first SCR, and appends a flag having a value of "1" to video, audio, and sub-picture data parsed from the first bit-streamed data. The video, the audio, and the sub-picture data having the flag of "1" appended are all stored into the buffer 16. The decoder 18 decodes the video, the audio, and the sub-picture data having the flag of "1" appended. The decoded video, audio, and sub-picture data are presented sequentially when their corresponding PTSs are equal to the first count value of the first timer 20.

Figure 2:
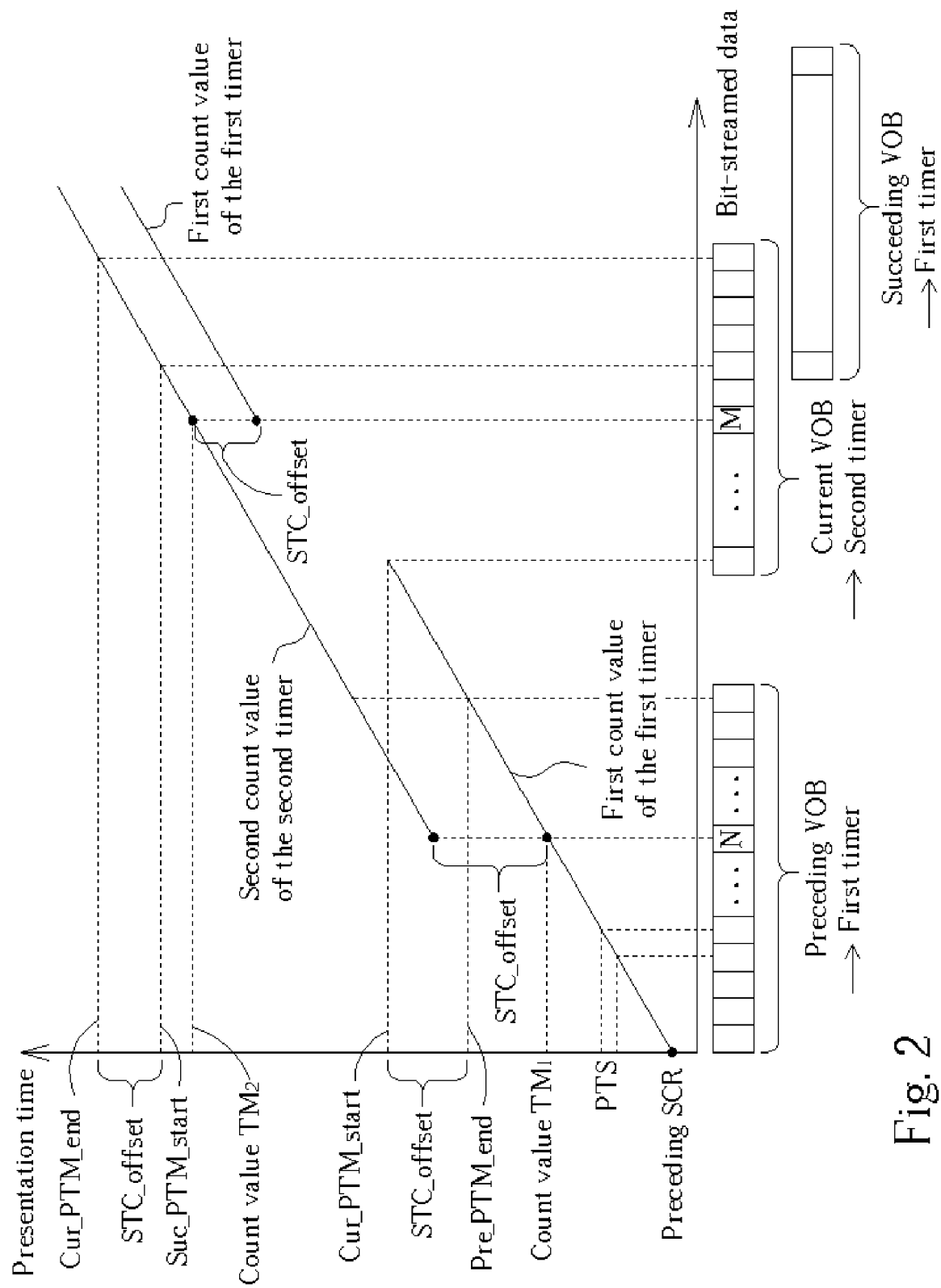
FIG. 2 is a diagram showing the relation between presentation time and bit-streamed data presented from the DVD seamless playback system shown in FIG. 1.

Then, the second processor 32 parses second bit-streamed data right next to the first bit-streamed data, and determines that a second SCR parsed from the second bit-streamed data is smaller than the first SCR stored in the second register 34 or larger than the first SCR stored in the second register 34 by the predetermined value. (a) If the second SCR is larger than the first SCR and the difference between them is smaller than the predetermined value, the second processor 32 updates the first SCR stored in the second register 34 with the second SCR, and appends a flag having a value of "1" to the video, the audio, and the sub-picture data parsed from the second bit-streamed data; (b) If the second SCR is smaller than the first SCR or is larger than the first SCR by a value larger than the predetermined value, discontinuity appearing, the second processor 32 still updates the first SCR stored in the second register 34 with the second SCR, but the second processor 32 appends a flag having a value of "2" rather than "1" to the video, the audio, and the sub-picture data parsed from the second bit-streamed data. Then, the second processor 32 detects that if the STC_offset value stored in the first register 14 is updated. ($b_1$) If the STC_offset value stored in the first register 14 is updated, the second processor 32 sets the second count initial value of the second timer 22 to a sum of the first count value of the first timer 20 and the updated STC_offset value, as shown in FIG. 2. ($b_2$) If the STC_offset value stored in the first register 14 is not updated, the second processor 32 sets the second count initial value of the second timer 22 to the second SCR. The decoder 18 decodes the video, the audio, and the sub-capture data having a flag having a value equal to "2" stored in the buffer 16. The decoded video, audio, and sub-picture data having the flag of the value of "2" appended are presented sequentially when their corresponding PTSs are equal to the second count value of the second timer 22.

Figure 4:
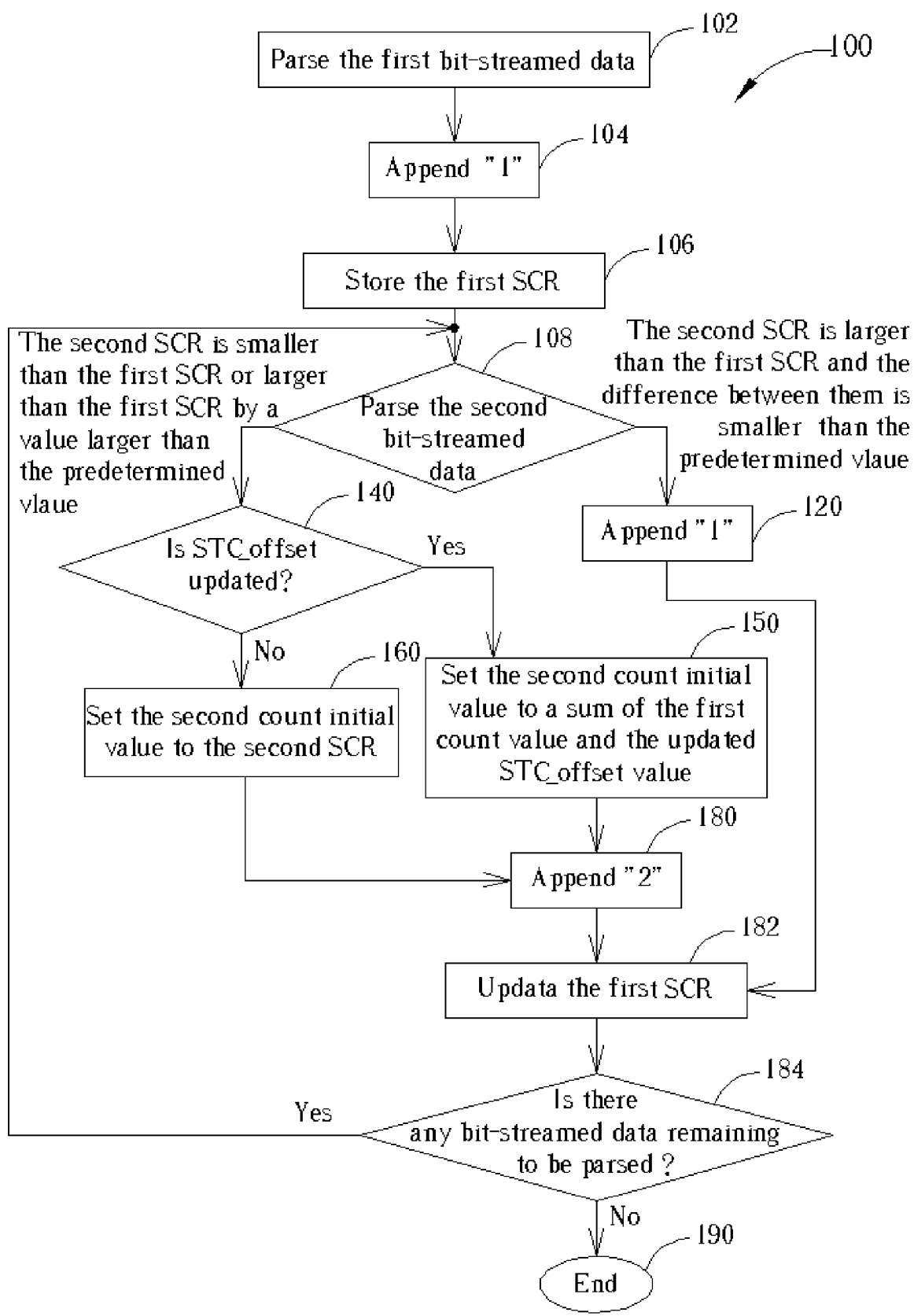
FIG. 4 is a flow chart demonstrating the operation of the DVD seamless playback system shown in FIG. 3.

Please refer to FIG. 4, which is a flow chart summarizing the operation 100 of the DVD seamless playback system 30 described above according to the present invention. The operation 100 comprises the following steps:

Step 102: Parse the first bit-streamed data and set the first count initial value of the first timer 20;

(The second processor 32 parses the first bit-streamed data and sets the first count initial value of the first timer 20 to the first SCR parsed from the first bit-streamed data.)

Step 104: Append a flag having a value of "1" to video, audio, and sub-picture data parsed from the first bit-streamed data;

Step 106: Store the first SCR parsed from the first bit-streamed data to the second register 34;

Step 108: Parse a second bit-streamed data and compare a second SCR parsed from the second bit-streamed data with the first SCR. If the second SCR is larger than the first SCR and a difference between them is smaller than a predetermined value, go to step 120, else go to step 140;

Step 120: Append a flag having a value of "1" to video, audio, and sub-picture data parsed from the second bit-streamed data. Go to step 180;

Step 140: Is the STC_offset value stored in the first register 14 updated? If yes, go to step 150, else go to step 160;

Step 150: Set the second count initial value of the second timer 22 to a sum of the first count value of the first timer 20 and the updated STC-offset value. Go to step 180;

Step 160: Set the second count initial value of the second timer 22 to the second SCR;

Step 180: Append a flag having a value of "2" to video, audio, and sub-picture data parsed from the second bit-streamed data;

Step 182: Update the first SCR stored in the second register 34 with the second SCR;

Step 184: Is there any bit-streamed data remaining to be parsed? If yes, go to step 108, else go to step 190; and Step 190: End.

Having come to step 184, the operation 100 sets the first and the second timers 20 and 22 alternatively if there is still some bit-streamed data remaining to be parsed.

The first processor 12 and the second processor 32 as well can be a reduced instruction set computer (RISC).

In contrast to the prior art, the present invention can provide a DVD seamless playback system having a processor and two timers alternatively set by the processor, so as to solve the problems of video-discontinuity and video-standstill of the prior art.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A DVD seamless playback system comprising:
a first timer for counting from a first count initial value;
a second timer for counting from a second count initial value;
a register for storing a system time clock offset (STC_offset) value;
a processor electrically connected to the register, the first timer and the second timer for detecting if the STC_offset value stored in the register is updated, for parsing a bit-streamed data into a presentation data having a flag appended, the flag having either a first value or a second value, and for setting the first count initial value and the second count initial value;
a buffer electrically connected to the processor for storing the presentation data parsed from the bit-streamed data; and
a decoder electrically connected to the buffer, the first timer and the second timer for decoding the presentation data stored in the buffer, presentation data having been decoded by the decoder being presented according to a first count value of the first timer if its flag has a value equal the first value, or to a second count value of the second timer if its flag has a value equal the second value;
wherein whenever the processor detects that the STC_offset value stored in the register is updated, and in the meantime if the processor parses a preceding bit-streamed data preceding the bit-streamed data into a presentation data having a flag having a value equal the first value, the processor sets the second count initial value of the second timer to a sum of the first count value of the first timer and the updated STC_offset value and parses the bit-streamed data into a presentation data having a flag having a value equal the second value, or the processor sets the first count initial value of the first timer to a sum equal the second count value of the second timer and the updated STC_offset value and parses the bit-streamed data into a presentation data having a flag having a value equal the first value.

2. The DVD seamless playback system of claim 1, wherein the processor is a reduced instruction set computer (RISC).

3. A DVD seamless playback system comprising:
a first timer for counting from a first count initial value;
a second timer for counting from a second count initial value;
a first register for storing a system time clock offset (STC_offset) value;
a second register for storing a navigation data;
a processor electrically connected to the first register, the second register, the first timer and the second timer for detecting if the STC_offset value stored in the first register is updated, for parsing a bit-streamed data into a navigation data and a presentation data having a flag appended, the flag having either a first value or a second value, for comparing the navigation data parsed from bit-streamed data and the navigation data stored in the second register, for storing the navigation data parsed from the bit-streamed data into the second register, and for setting the first count initial value and the second count initial value;
a buffer electrically connected to the processor for storing the presentation data parsed from the bit-streamed data; and
a decoder electrically connected to the buffer, the first timer and the second timer for decoding the presentation data stored in the buffer, presentation data having been decoded by the decoder being presented according to a first count value of the first timer if its flag has a value equal the first value, or to a second count value of the second timer if its flag has a value equal the second value;
wherein whenever the processor determines that the navigation data parsed from the bit-streamed data is smaller than the navigation data stored in the second register or larger than the navigation data stored in the second register by a predetermined value, the processor then detects whether the STC_offset value stored in the first register is updated, (a) if the processor detects that the STC_offset value stored in the first register is updated, and in the meantime ($a_1$) if the processor is appending a flag whose value equals the first value to a presentation data parsed from a preceding bit-streamed data preceding the bit-streamed data, the processor sets the second count initial value of the second timer to a sum of the first count value of the first timer and the updated STC_offset value and parses the bit-streamed data into a presentation data having a flag having a value equal the second value; otherwise ($a_2$) the processor sets the first count initial value of the first timer to a sum of the second count value of the second timer and the updated STC_offset value and parses the bit-streamed data into a presentation data having a flag having a value equal the first value; on the contrary, (b) if the processor detects that the STC_offset value stored in the first register is not updated, and in the meantime ($b_1$) if the processor is appending a flag whose value equals the first value to the presentation data parsed from the preceding bit-streamed data, the processor sets the second count initial value of the second timer to a navigation data parsed from the bit-streamed data and parses the bit-streamed data into a presentation data having a flag having a value equal the second value; otherwise ($b_2$) the processor sets the first count initial value of the first timer to the navigation data parsed from the bit-streamed data and parses the bit-streamed data into a presentation data having a flag having a value equal the first value.

4. The DVD seamless playback system of claim 3, wherein the processor is a reduced instruction set computer.

5. The DVD seamless playback system of claim 3, wherein the navigation data is a system clock reference (SCR) of the bit-streamed data.

* * * * *